United States Patent [19]

Baillie

[11] 4,039,431
[45] Aug. 2, 1977

[54] PARTICULATE MATERIAL DISTRIBUTOR AND METHOD INVOLVING USE OF SAME

[75] Inventor: Lloyd A. Baillie, Homewood, Ill.

[73] Assignee: Atlantic Richfield Company, Philadelphia, Pa.

[21] Appl. No.: 625,353

[22] Filed: Oct. 23, 1975

[51] Int. Cl.² .................... B01J 8/02; B65G 65/32; C10G 13/00
[52] U.S. Cl. ................ 208/146; 23/288 R; 214/17 CB; 222/193
[58] Field of Search ............... 23/288 R; 214/17 CB; 302/60, 61; 239/666, 687; 222/193; 208/146

[56] References Cited

U.S. PATENT DOCUMENTS

| 2,119,571 | 6/1938 | Coolidge | 214/17 CB UX |
| 3,361,258 | 1/1968 | Kalke | 214/17 CB X |
| 3,490,619 | 1/1970 | De Wittie | 214/17 CB |
| 3,854,634 | 12/1974 | Hart | 222/193 |
| 3,854,637 | 12/1974 | Muller, Jr. et al. | 222/564 |
| 3,880,300 | 4/1975 | Uhl | 23/288 R X |
| 3,972,567 | 8/1976 | Uhl | 222/193 X |

Primary Examiner—Joseph Scovronek
Attorney, Agent, or Firm—Frank J. Uxa

[57] ABSTRACT

An improved apparatus for distributing particulate material, e.g., comprising catalyst particles, over a zone, e.g., chemical reaction zone, comprising:
a supply hopper, having inlet means and outlet means, for holding particulate material;
a deflection plate located adjacent to the end of the outlet means away from said supply hopper to deflect the direction of at least a portion of the particulate material flowing through the outlet means; and
at least one rotatable conduit in fluid communication with at least one source of gaseous media, the conduit being situated such that at least a portion of the gaseous media from the conduit flows in the space between the end of the outlet means away from the supply hopper and the deflection plate to thereby cause at least a portion of the particulate material to be propelled in substantially the same direction as the flow.

15 Claims, 8 Drawing Figures

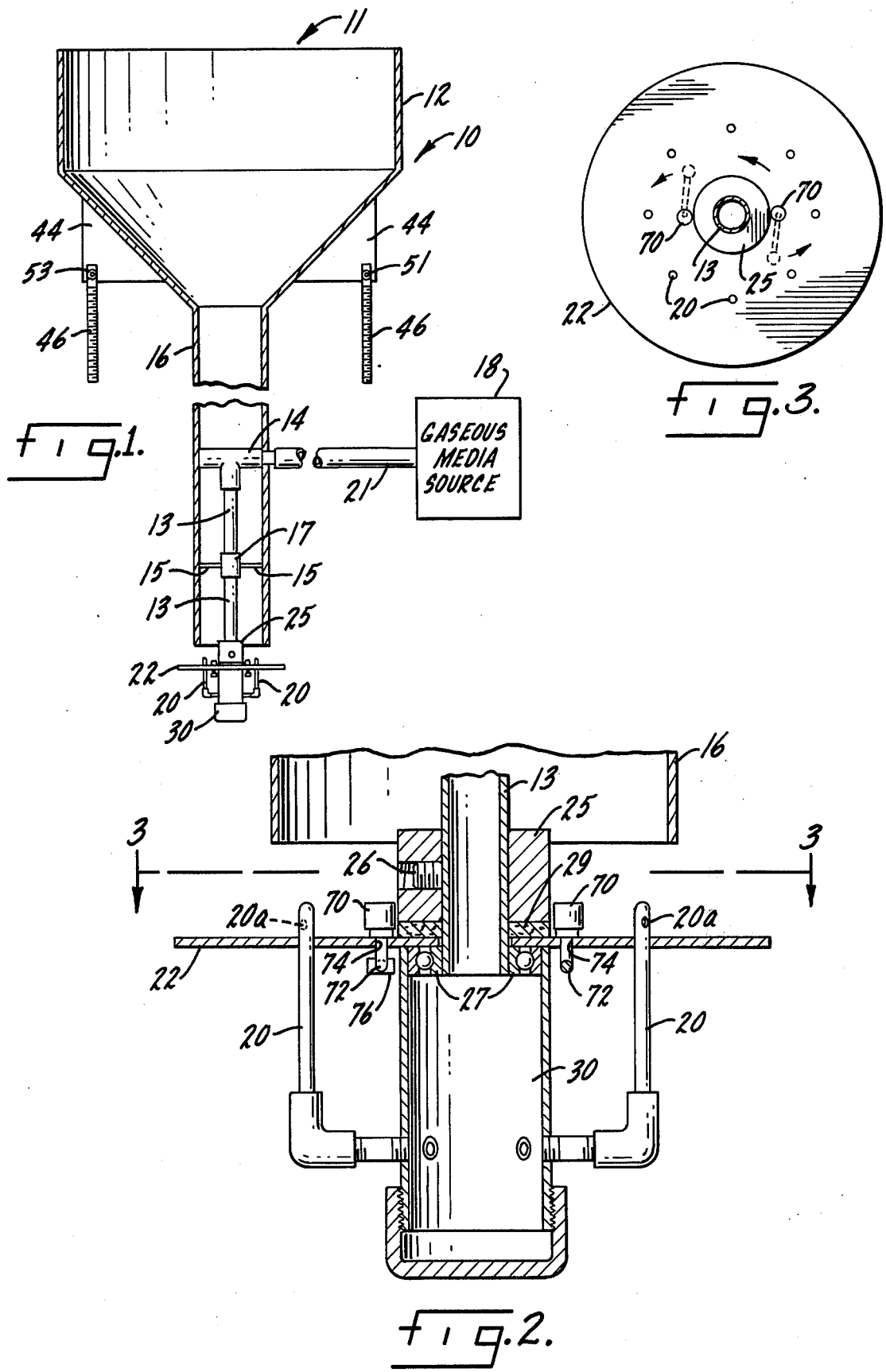

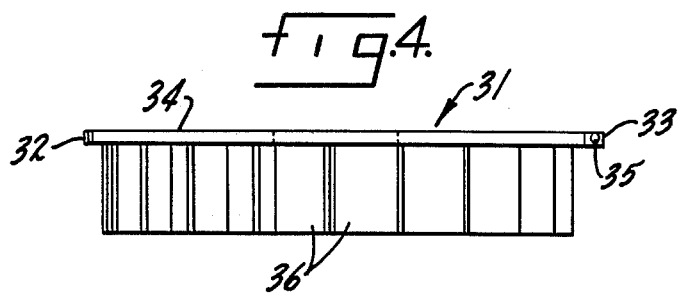
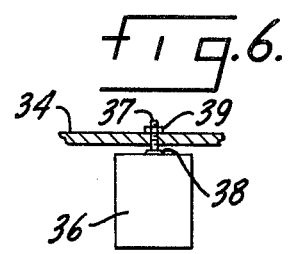
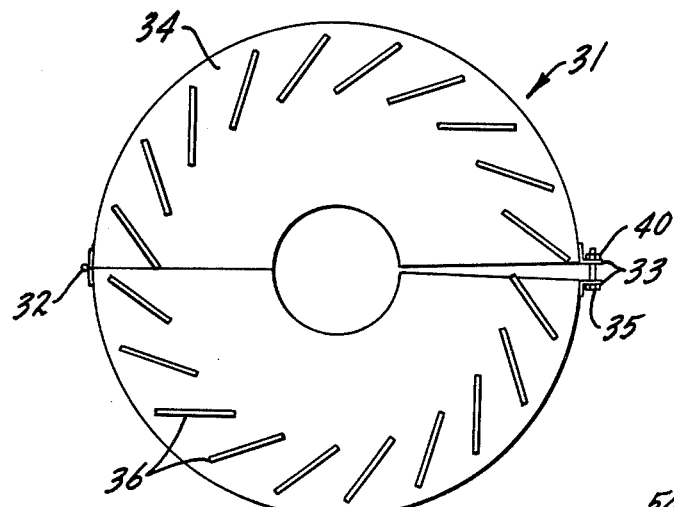
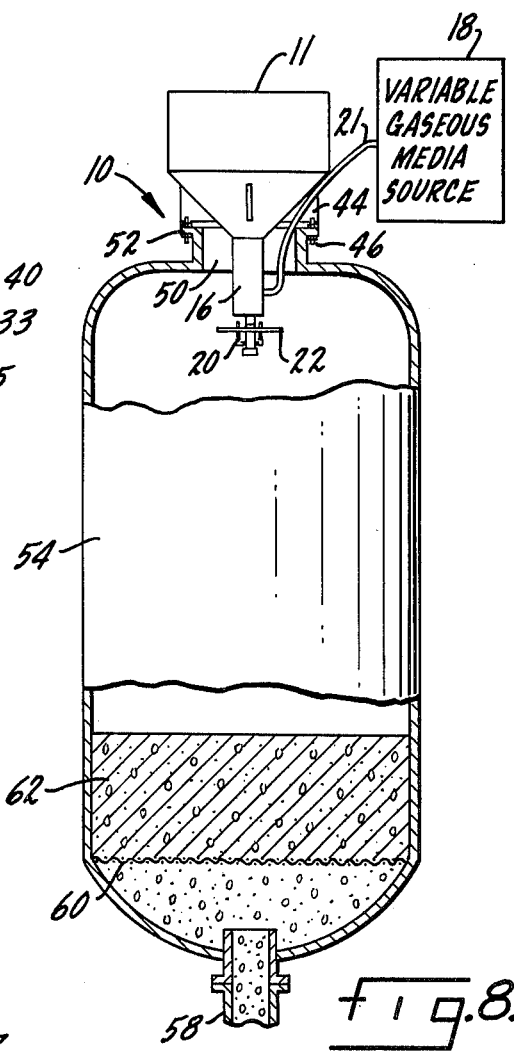
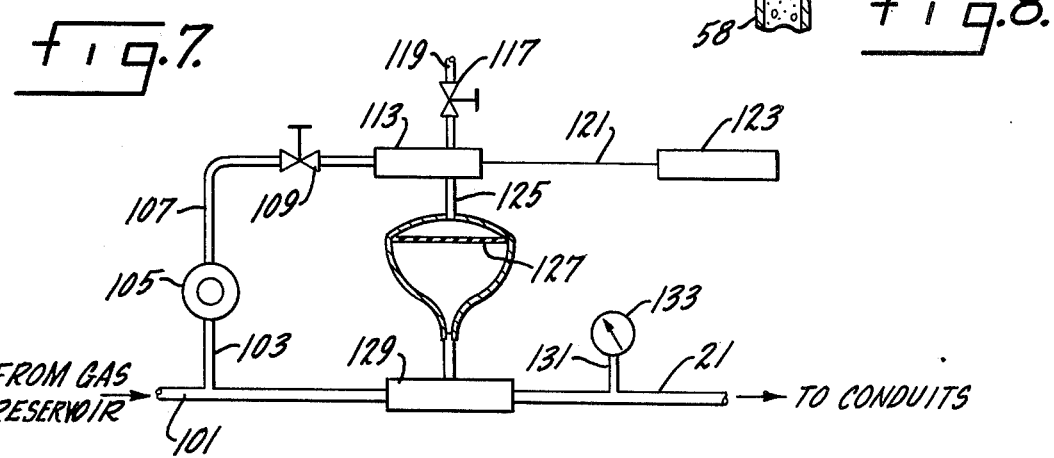

PARTICULATE MATERIAL DISTRIBUTOR AND METHOD INVOLVING USE OF SAME

The present invention relates to an improved particulate distributor. More particularly, the present invention relates to an improved apparatus and method for distributing solid particulate material, such as a catalyst, over a zone, such as a catalytic reactor.

Many instances, for example, throughout the process industries, require that solid particulate material be placed in a confined zone. For example, in the petroleum and chemical process industries, solid particulate catalyst is often placed in a confined chemical reaction zone in order to promote desired chemical reactions. It is desirable that the particulate material be distributed over the zone in a substantially uniform fashion. Therefore, it would be advantageous to develop an improved apparatus and method for distributing particulate material over a zone.

One problem which is commonly encountered in distributing particulate material over a zone is that the inlet through which particulate material is to be introduced into the zone is relatively small and/or is difficult to reach, especially with complex distribution apparatus. In addition, complex or sophisticated apparatus are often difficult to operate efficiently in actual in-service environments, e.g., a chemical reaction within a petroleum refinery. U.S. Pat. No. 3,854,637 discloses an apparatus which employs the indirect flow of air from stationary air jets to distribute catalyst. However, such stationary air jets often must be constructed and placed in the zone with great precision to avoid wide distortions in catalyst distribution. For example, even slight variations in air flow from such stationary air jets, e.g., due to slight differences in jet or nozzle size, can cause uneven distribution of catalyst. Therefore, it would be advantageous to develop a relatively small and simple apparatus for distributing solid particulate material over a zone.

Therefore, one of the objects of the present invention is to provide an apparatus for distributing particulate material, e.g., catalyst, over a zone, e.g., chemical reaction zone.

Another object of the present invention is to provide an improved method for distributing solid particulate material over a zone. Other objects and advantages of the present invention will become apparent hereinafter.

An improved apparatus for distributing solid particulate material over a zone has now been found. In accordance with the present invention, the distribution apparatus comprises a supply hopper, having an inlet and an outlet, for holding solid particulate material; a deflection plate located adjacent to the end of the outlet means away from the supply hopper to deflect the direction of at least a portion of the particulate material flowing through the outlet means; and at least one rotatable conduit, preferably a plurality of rotatable conduits, in fluid communication with at least one source of gaseous media, the rotatable conduit or conduits being situated such that at least a portion of the gaseous media from the rotatable conduit or conduits flows in the space between the end of the outlet means away from the supply hopper and the deflection plate to thereby cause at least a portion of the particulate material to be propelled in substantially the same direction as the flow of gaseous media. Thus, as the conduit or conduits rotate, gaseous media from each such rotatable conduits acts to propel particulate material substantially along the entire path of its rotation. In this manner, variations in size and positioning between individual conduits are of substantially less importance or criticality than is the case when the conduits are stationary and propel particulate material in substantially a single direction. In a preferred embodiment, the deflection plate of the present application rotates along with the rotatable conduit or conduits. Thus, in one specific embodiment, the rotatable conduit or conduits extend from below the deflection plate up through this plate to the space between the end of the outlet means away from the supply hopper and the deflection plate. In this embodiment, the flow of gaseous media from the rotatable conduit or conduits may also act as a propelling force to rotate the conduit or conduits and deflection plate around such end of the outlet means.

In a further preferred embodiment, the present apparatus further comprises redirection means located in the path through which at least a portion of the particulate material is propelled to redirect such particulate material so that the particulate material is substantially uniformly distributed over the cross-section of the zone. In a preferred alternate embodiment, the amount, i.e., time rate of flow, of gaseous media supplied to and flowing from the rotatable conduit or conduits is varied in a predetermined manner so that the particulate material is substantially uniformly distributed over the zone. Thus, it can be seen that by using the present reduction means or by varying the flow of gaseous media to the rotatable conduit, or conduits, zones of widely differing sizes can be substantially uniformly covered with particulate material using a single, relatively small apparatus according to the present invention.

It is preferred that the deflection plate of the present apparatus have a configuration which can be substantially aligned with the configuration of the supply hopper outlet means. Although both the deflection plate and outlet means may have any configuration, more preferably both the deflection plate and supply hopper outlet means are substantially circular in cross-section. Also, it is preferred that the deflection plate be larger in size than the cross-section of the outlet means. The cross-sectional area of the termination of the outlet means depends, for example, on the size of the particulate material to be distributed and the flow rate of particulate material desired in the outlet means. In a preferred embodiment, the termination of the outlet means has a cross-sectional area of at least about 20 in.$^2$, more preferably at least about 30 in.$^2$, and the deflector plate has a cross-sectional area of at least about 40 in.$^2$, more preferably at least about 50 in.$^2$. The deflection plate is preferably situated relative to the termination of the outlet means so that particulate material flows freely from the outlet means when gaseous media flows through the conduits and essentially stops when this gas flow stops. The distance between the termination of the outlet means and the deflection plate depends, for example, on the size of the particulate material being distributed. Preferably, this distance is at least about 0.5 in., and more preferably at least about 0.75 in.

The present apparatus is useful in distributing any solid particulate material over a zone and it is particularly adapted to distributing solid catalyst particles into or over a reactor, e.g., chemical reaction zone. In certain instances, one structure, e.g., reactor, may include two or more zones over which solid particulate material, e.g., catalyst, is to be distributed. This situation may result from, for example, internal partition of the space within the structure into distinct zones, or the presence of internal hardware which form obstructions, and thus, restrict the solid particulate material from being distributed over the entire cross-section of the structure from a single point. In these instances, the position of the present apparatus can be adjusted or more than one of such apparatus can be employed to provide substantially uniform distribution of solid particulate material over each of the zones included in the structure.

The gaseous media referred to above may be any substantially inert gaseous material, i.e., gaseous material which does not substantially harm either the distribution apparatus or the particulate material being distributed. Examples of such materials include the inert gases, i.e., helium, neon, argon and the like, nitrogen, mixtures of nitrogen and oxygen, hydrogen and the like. Because of availability and convenience, the preferred gaseous media is air. The amount of gaseous media supplied to the conduit may vary with time in a predetermined manner so that the particulate material is substantially uniformly distributed over the entire cross-section of the zone. The flow-rate of gaseous media supplied to the conduit(s) may vary over a broad range and any specific flowrate range is not critical to the present invention. The gaseous media flowrate chosen is dependent, for example, on the size of the zone over which the particulate material is to be distributed, the size and number of conduits, the size and weight of the particulate material to be distributed, the speed of rotation desired for the conduits and, preferably the deflection plate, and the like. Preferably, the gaseous media is supplied to the conduit(s) at a flowrate of at least about 1.0 SCF/min., more preferably from about 1.0 SCF/min. to about 100 SCF/min. or more. Preferably, the gaseous media is supplied to the conduit or conduits at a time average variable flowrate of at least about 1.0 SCF/min. More preferably, the gaseous media is supplied to the conduit(s) at time average variable flowrates ranging from about 1.0 SCF/min. to about 100 SCF/min. or more. Standard conditions for measuring gas volumes are 60° F. temperature and one atmosphere pressure. Of course, if the zone over which the particulate material is to be distributed is itself at elevated pressure, the gaseous media is supplied to the conduit(s) at an elevated pressure relative to the pressure in this zone.

The source of the gaseous media can be any means conventionally used to supply gases. For example, a reservoir, e.g., cylinder, of highly compressed gas can be used as the source. Also, a gas compressor can be used. Conventional valving arrangements can be employed to insure that the gaseous media is supplied to the conduits at the proper, e.g., constant or variable, flowrate. The gaseous media flowrate to the conduit(s) can be varied by manual manipulation of conventional valve means. However, in a preferred embodiment, the flowrate is varied using automatic means, i.e., means which do not require any direct human manipulation of the gaseous media flowrates. Typical automatic means are described in detail hereinafter.

The flowrate of gaseous media supplied to the conduit(s) is preferably varied in a predetermined manner to provide substantially uniform distribution of the particulate material over a zone. Thus, the greater the flowrate of the gaseous media supplied to the conduit(s), the farther the solid particulate material is propelled. By varying the flowrate of the gaseous media supplied to the conduit(s), the distance through which the particulate material is propelled may be controlled, thus providing that the particulate material substantially uniformly covers the entire zone.

The present distribution apparatus comprises at least one rotatable conduit situated such that at least a portion of the gaseous media flows from the rotatable conduit or conduits into the space between the termination of the outlet means and the deflection plate. If the apparatus comprises a plurality of rotatable conduits, and a rotatable deflection plate and the gaseous media flowing from the conduits acts as a rotational force, it is preferred that the conduits be substantially evenly spaced around the deflection plate so as to provide for balanced and stable rotation. Of course, at least a portion of the force required to rotate the conduit(s) (and deflection plate) can be supplied by a separate power source, e.g., an electrically or pneumatically powered motor. Such power source may act to maintain or control the speed of rotation of the conduit(s), e.g., at a constant or predetermined variable speed. In a more preferred embodiment, the number of conduits ranges from about two to about 24, more preferably from about two to about eight. Although the outlets of the rotatable conduits may be situated at any horizontal level, it is preferred that these outlets be at the same horizontal level. Although the dimensions of the conduit outlets is not critical to the present invention, it is preferred that the cross-sectional area of each conduit outlet range from about 0.001 in.$^2$ to about 0.1 in.$^2$, more preferably from about 0.001 in.$^2$ to about 0.01 in.$^2$.

Various redirection means may be included in the present apparations. Preferably, the location of at least a portion of such redirection means can be altered so that particulate material can be substantially uniformly distributed over zones of widely varying configurations or cross-sections.

The apparatus of the present invention may be fabricated from any suitable material of construction. The material of construction used is dependent on the particular application involved. In many instances, metals and metal alloys, such as iron, carbon steel or stainless steel, copper and the like may be used. Of course, the apparatus should be made of a material or combination of materials which is substantially unaffected by the particulate material and the conditions, e.g., temperature, pressure and the like, at which the apparatus is normally operated. In addition, such material or materials should have no substantial detrimental effect on the particulate material being processed.

These and other aspects and advantages of the present invention are set forth in the following detailed description and claims, particularly when considered in conjunction with the accompanying drawings in which like parts bear like reference numerals. In the drawings:

FIG. 1 is a partially broken sectional elevational view of a particulate distributor in accordance with the present invention.

FIG. 2 is a partially broken sectional elevational view of a portion of the present distribution apparatus shown in FIG. 1 on an enlarged scale.

FIG. 3 is a detail sectional view on a reduced scale taken on line 3—3 of FIG. 2.

FIG. 4 is a side elevational view of the redirection means of the present apparatus.

FIG. 5 is a bottom side view of the redirection means shown in FIG. 4.

FIG. 6 is a sectional elevational view of a portion of the redirection means shown in FIGS. 4 and 5.

FIG. 7 is a schematic drawing of automatic means to vary the flowrate of gaseous media supplied to the conduit(s) of the present apparatus.

FIG. 8 is a sectional elevational view illustrating utilization of a particulate distributor in accordance with the present invention to distribute catalyst material within a catalyst reactor.

Particulate distributor 10 depicted in FIG. 1 includes supply hopper 12 which, for example, can be made of a sheet metal and can have a substantially frustoconical shape being larger at the upper end. Supply hopper 12 has inlet means 11 through which particulate material can be loaded. A vertical discharge pipe 16 is formed at the termination of supply hopper 12. The hopper 12 can be made of any desired capacity and can have a removable extension for its sides to increase its capacity. The upper end of the hopper 12 can be a square cross-section or a circular cross-section. The capacity extension for the hopper can be mounted vertically or tangentially.

Gas pipe 13 is located, preferably centrally located, in discharge pipe 16. Gas header 21 provides fluid communication between gaseous media source 18 and gas pipe 13. Gas header 21 can be made of flexible material so that gas pipe 13 and gaseous media source 18 may be removed from each other by relatively long distances, which distances can be varied from time to time. Gas header 21 is connected to gas pipe 13 by means of standard T-fitting 14. Gas pipe 13 is centered within discharge pipe 16 by supports 15 and support adapter 17. Gas pipe 13 provides fluid communication between gaseous media source 18, gas chamber 30 and conduits 20. The outlets 20a of conduits 20 are located in the space between the termination of discharge pipe 16 and deflection plate 22. Deflection plate 22 is attached, e.g., welded, to gas chamber 30.

The termination of discharge pipe 16 and deflection plate 22 are both circular in configuration with deflection plate 22 being larger than the termination of discharge pipe 16.

Gaseous media source 18 provides gaseous media at a predetermined flowrate to the outlets 20a of conduits 20 by means of gas header 21, gas pipe 13 and gas chamber 30. Gaseous media source 18 may involve a reservoir of highly pressurized inert gas, e.g., air, and a conventional valving arrangement to provide gaseous media at the desired flowrate.

FIG. 2 illustrates in more detail the lower portion of the embodiment of the present apparatus shown in FIG. 1. Gas pipe 13 is centrally located in discharge pipe 16. Adaptor block 25 encircles gas pipe 13 and is securely fastened in place by means of set screw 26. Felt washer 29 acts as a buffer between the lower surface of stationary adapter block 25 and rotating deflection plate 22. Gas pipe 13, which itself is stationary, extends below deflection plate 22 to the innerrace of bearing 27 which is press fitted to 13. Of course, adapter block 25 is not affixed to deflection plate 22. Bearing 27 is fitted between conduit 13 and chamber 30 and acts to facilitate the rotation of conduits 20, gas chamber 30 and deflection plate 22 around gas pipe 13. Conduits 20 extend from gas chamber 30 below deflection plate 22 up through deflection plate 22 and terminate in the space between deflection plate 22 and the termination of discharge pipe 16. The outlets 20a of conduits 20 are positioned so as to provide sufficient force to cause the rotation of conduits 20, deflection plate 22 and gas chamber 30 when gaseous media is expelled through such outlets 20a. In the embodiment shown, the outlets 20a of conduits 20 are situated so that gaseous media is expelled from conduits 20 at an angle of about 45° from tangential to plate 22.

In a preferred embodiment, the present apparatus further includes brake means being situated so as to control the rate of rotation of the conduit or conduits. Thus, as shown in FIGS. 2 and 3, a specific example of such brake means involves two oppositely situated eccentric brakes 70. Each of these brakes 70 is attached to rod 72 which extends through holes 74 in deflection plate 22 and is, in turn, attached to weight 76. Rods 72 are sized in holes 74 so as to allow brakes 70 to come in contact with adapter block 25. As the conduits 20, gas chamber 30 and deflection plate 22 rotate, centrifugal force acts to push weights 76 outward away from gas chamber 30. This movement of weights 76 causes brakes 70 to push against stationary adapter block 25. In this manner, the rate of rotation of conduits 20 is controlled since the friction created by the contact of brakes 70 with stationary adapter block 25 causes a reduction in the rate of rotation of conduits 20.

Redirection means, shown generally as 31 in FIG. 4, is adapted to be secured, e.g., clamped, to discharge pipe 16. Redirection means 31 comprises plane 34. Secured to plane 34 are a plurality of vanes 36. The position of each vane 36 can be altered relative to plane 34. Redirection means 31 acts to redirect the path of at least a portion of the particulate material which is propelled by the flowing gaseous media as conduits 20 rotate so that the particulate material is substantially uniformly distributed over the zone. Hinge 32 is attached, e.g., bolted, onto the side of plane 34 to allow the two halves of plane 34 to be parted so that plane 34 can be fitted around discharge pipe 16. Brackets 33 are attached to each half of plane 34 opposite hinge 32. Once plane 34 is fitted around discharge pipe 16, removable bolt 35 is inserted through holes in each bracket 33. Nut 40 is screwed onto bolt 35 until plane 34 is securely attached or fastened to discharge pipe 16.

FIG. 6 illustrates one embodiment in which the position of the vanes 36 can be adjusted relative to plane 34. Screw 37 is attached to vane 36 by means of weld 38. Screw 37 is then placed through plane 34. The rotational position of vane 36 relative to plane 34 can be adjusted and then set by first loosening and then tightening nut 39.

FIG. 7 is a schematic drawing of one alternate and preferred embodiment of the present invention by which the flowrate of gaseous media supplied to rotatable conduits 20 is automatically varied in a predetermined manner. In FIG. 7, air from a reservoir for holding air at an elevated pressure flows in line 101 toward diaphragm operated gate valve 129. A slip stream of this air flows in line 103 to air regulator 105 which acts to maintain a constant reduced pressure of air in line 107. Electrically responsive three way valve 113, acting in response to electrical device 123 through electrical line 121 controls the air pressure in line 125 to diaphragm 127. The position of diaphragm 127 determines the position of gate valve 129 and, thus, the flowrate of air through gate valve 129 into gas header 21. In this manner the air flowrate in gas header 21 may be varied. Pipe 131 provides fluid communication between gas header 21 and pressure gauge 133.

Electrical device 123 may comprise, for example, a time programmed electrical switch which acts on valve 113 through electrical line 121 to control the pressure of air in line 125. The device 123 can be programmed in a predetermined manner to vary the amount of air supplied to conduits 20 so that the particulate material may be distributed substantially uniformly over the zone.

Operation of the automatic system shown in FIG. 7 is illustrated as follows. As the air pressure in line 125 increases, gate valve 129 opens allowing more air to flow from line 101 to gas header 21. With switch 123 in the closed position, electrically responsive three way valve 113 is positioned to provide fluid communication between lines 107 and 125. The air pressure in line 125 is essentially the same as the air pressure in line 107 and is maximized. Thus, the air flow from line 101 through gate valve 129 to gas pipe 13 is also maximized. After a predetermined period of time, time programmed switch 123 opens. An electrical signal is sent through line 121 to three way valve 113 causing valve 113 to position itself so that fluid communication between lines 119 and 125 is established and fluid communication between lines 107 and 125 is blocked. Since line 119 is at a reduced pressure relative to the pressure in line 125, air flows from line 125 through valve 113 to line 119. Thus, the pressure in line 125 and diaphragm 127 is reduced. In turn, gate valve 129 moves to a closed position to stop, or at least minimize the flow of air from line 101 through gate valve 129 to gas pipe 13. After another period of time, time programmed switch 123 closes, thus causing valve 113 to change position so that fluid communication between lines 125 and 119 is blocked and communication between lines 107 and 125 is restored. Needle valves 109 and 117 in lines 107 and 119 respectively, can be adjusted to restrict the flow of air through these lines. In this manner, the rate at which gate valve 129 is opened and closed can be varied. The above cycle is continually repeated until the particulate material has been substantially evenly distributed over the zone.

In an alternate embodiment, valve 113, rather than being electrically responsive, is directly responsive to the movement of a cam rider. The properly shaped and sized cam revolves at a predetermined speed so as to move the cam rider and, thus, open and close valve 113, ultimately, vary the flowrate of gaseous media to conduits 20 in a predetermined manner. Other conventional and well known means for automatically varying gaseous media flowrates can be used in conjunction with the present apparatus. Any such automatic means is suitable provided that the flowrate of the gaseous media to the conduits 20 is varied in a predetermined manner so as to provide substantially uniform distribution of the particulate material over the zone.

FIG. 8 illustrates operation of a particulate material distributor to distribute catalyst in a catalytic reactor in accordance with the present invention. Distributor 10 is positioned to discharge catalyst through catalyst inlet 50 in the upper surface 52 of catalytic reactor 54. For this purpose particulate distributor 10 is provided with a plurality of support flanges 44 each of which may be equipped with a mounting bolt 46 to mount particulate distributor 10 to upper surface 52. Support flanges 44 also can be set directly on upper surface 52 with shims utilized to level hopper 12. As seen in FIG. 1, bolts 46 are connected to flanges 44 by means such as bolts 51 and nuts 53. Catalytic reactor 54 is of a cylindrical configuration, having a catalyst inlet 50 in its upper area. Reactor 54, for example, can include a reactor outlet 58, a support screen 60 to support catalyst material 62 a short distance above the lower surface of the reactor. Consequently, when the reactor 54 is in use, generally downwardly flowing reactant enters through, for example, the catalyst inlet 50, passes through catalyst material 62 and exits reactor 54 through reactor outlet 58 at or near the lower surface to reactor 54.

To charge reactor 54 with catalyst by means of particulate distributor 10, a quantity of the catalyst material is provided to supply hopper 12, and variable gaseous media source 18 is activated to supply air at a predetermined, flowrate to rotatable conduits 20. Catalyst flows from supply hopper 12 through discharge pipe 16 out of the bottom of discharge pipe 16 and into the path of the air flowing from rotating conduits 20. At least a portion of the catalyst is propelled by the predetermined variable air flowrates from rotating conduits 20 substantially in the direction of such flow as the conduit 20 rotates so that the catalyst material is substantially uniformly distributed over the cross-section of reactor 54.

With the apparatus of the present invention, catalyst can be charged generally downwardly in reactor 54. Typically, reactors ranging in size from between about 1 to about 15 feet, preferably from about 3 to about 13 feet in diameter, and from about 5 to about 125 feet, more preferably from about 10 to about 70 feet, in length can be charged by the apparatus of the present invention. The catalyst is preferably charged to the reactor at a rate of fill of the reactor of up to about 17 vertical inches per minute, more preferably from about 1 to about 6 and still more preferably, from about 2 to about 4 inches per minute. The rate of fill of the reactor can be non-uniform, that is, the rate of fill can vary within the above range. It is preferred, however, that the rate of fill be uniform and that after a given rate of fill is established, that this rate of fill be maintained while adding particulate material to the catalyst bed. The catalyst particles are introduced into the reactor at a point such that the distance to the catalyst surface formed as the catalyst particles are introduced through a gaseous medium provides an average free fall distance of catalyst particles of at least about 1 foot, more preferably, an average free fall distance of from about 5 to about 125 feet and still more preferably, from about 10 to about 70 feet. In general, the minimum free fall distance provides for a downwardly velocity sufficient to orient the catalyst particle along the major axis of the catalyst particle, that is the free fall distance should be sufficient to provide for the catalyst particle to move a slight vertical distance upwardly after contact with the catalyst surface in order to accomplish the orientation. Thus, in general, the catalyst particles fall individually to the catalyst surface as the catalyst bed is formed. The orientation of the catalyst particle produced in this manner provides for the substantially horizontal orientation of the catalyst particles on an average basis in that the most probable orientation of the longitudinal axis of catalyst particles is horizontal. In addition, catalyst particles having a substantially horizontal orientation are defined herein to provide a catalyst surface which has a difference between the highest portion of the catalyst surface and the lowest portion of the catalyst surface which is less than 10% of the diameter of the catalyst bed, that is a substantially flat surface more preferably less than 5% and still more preferably less than 1%.

A wide variety of solid catalysts can be distributed with the apparatus of this invention, for example, oxidation, hydrodesulfurization, hydrocracking cracking, reforming and hydrogenation catalysts. Typical examples of hydrodesulfurization catalysts comprise any of the transition metals, metal oxides, metal sulfides, or other metal salts which are known to catalyze hydrodesulfurization, and are not poisoned by hydrogen sulfide or other sulfur compounds. The preferred catalysts comprise the oxides and/or sulfides, as for example, the oxides or sulfides of molybdenum, tungsten, iron, cobalt, nickel, chromium and the like. Vanadium compounds may also be employed in some cases. A particularly active combination consists of a Group VIB metal oxide or sulfide with a Group VIII metal oxide or sulfide. For example, compositions containing both molybdenum oxide and cobalt oxide, molybdenum oxide and nickel oxide, tungsten sulfide and nickel sulfide, and the like may be employed.

A particularly active catalyst consists of the composite known as cobalt molybdate, which actually may be a mixture of cobalt and molybdenum oxides wherein the atomic ratio of Co to Mo may be between about 0.4 and 5.0. This catalyst, or any of the above catalyst may be employed in unsupported form, or alternatively it may be suspended on a suitable adsorbent oxide carrier such as alumina, silica zirconia, thoria, magnesia, titania, bauxite, acid-activated clays, or any combination of such materials.

Typical examples of hydrocracking catalysts are crystalline metallic alumino-silicate zeolite, having a platinum group metal, e.g., platinum or palladium, deposited thereon or composited therewith. These crystalline zeolites are characterized by their highly ordered crystalline structure and uniformly dimensioned pores, and have an alumino-silicate anionic cage structure wherein alumina and silica tetrahedra are intimately connected to each other so as to provide a large number of active sites, with the uniform pore openings facilitating entry of certain molecular structures. It has been found that crystalline aluminosilicate zeolites, having effective pore diameter of about 6 to 15A units, preferably about 8 to 15A units, when composited with the platinum group metal, and particularly after bases exchange to reduce the alkali metal oxide, e.g., $Na_2O$, content of the zeolite to less than about 10 weight percent, are effective hydrocracking catalysts.

Other catalysts are supported hydrogenation catalysts comprising a Group VIII metal in the Periodic Table, such as nickel, cobalt, iron or one of the platinum group metals such as palladium, platinum, iridium, or ruthenium on a suitable support. Generally, it is preferred that an oxide or sulfide of a Group VIII metal (particularly iron, cobalt, or nickel) be present in mixture with an oxide or sulfide or a Group VIB metal (preferably molybdenum or tungsten). Suitable carriers or supports include acidic supports such as silica-alumina, silica-magnesia, and other well-known cracking catalyst bases; the acidic clays; fluorided alumina; and mixtures of inorganic oxides, such as alumina silica, zirconia, and titania, having sufficient acidic properties providing high cracking activity.

In addition, the various metals and metal oxides and sulfides can be utilized on a mixture of support materials. Thus, for example, a zeolite and an alumina can be blended together as a support material in varying proportions which support materials contain various metals deposited thereon.

Typical examples of cracking catalyst are the well-known commercial varieties, e.g., Davison XZ-25, Aerocat Triple S-4, Nalcata KSF, Houdry HZ-1, etc. These catalysts are made up of a silica-alumina-zeolite base in particle sizes usually with a size range of one thirty-second to three-eights inch, suitable one-sixteenth to one-eighth inch, and containing rare earth metal oxides.

Typical compositions of the catalysts are the following. Davison XZ-25, a product of Davison Chemical Company, is mixed silica-alumina-zeolite cracking catalyst containing about 30-35 weight percent alumina, 18 weight percent zeolite X and about 2 weight percent cerium and 1 weight percent lanthanum. Aerocate Triple S-4, a product of American Cyanamid Company, is a silica-alumina-zeolite cracking catalyst containing about 32 weight percent alumina, 3 weight percent zeolite Y, 0.5 weight percent cerium and 0.1 weight percent lanthanum. Nalcat KSF, a product of Nalco Chemical Co., is a silica-alumina zeolite, cracking catalyst containing about 31-35 weight percent alumina, 11 percent zeolite X, about 1 percent cerium and 0.3 percent lanthanum.

Preferably supply hopper 12 can hold a substantial quantity of particulate material. Such material frequently comes in supply drums, and preferably supply hopper 12 can hold at least one drum of particulate material. Extensions can be added to the sides of supply hopper 12 to increase its capacity while still permitting ready transport and storage. The use of such extensions is facilitated if the upper end of supply hopper 12 has a square cross-section, rather than a circular cross-section.

As a specific example, a particulate distributor in accordance with the present invention can be provided with supply hopper 12 having at its upper end a square cross-section with each side in the order of 3 feet, and at its lower end a circular cross-section, with a diameter in the order of 6 inches to join discharge pipe 16. The sides of such hopper 12 are inclined at an angle in the order of 30°. Discharge pipe 16 is circular in cross-section and has a diameter on the order of 6 inches, while deflection plate 22 is also circular and has a diameter of about 10 inches. Eight circular conduit outlets 20a each have a cross-section area of about 0.01 in.$^2$. Deflection plate 22 is located so that the vertical distance between it and the termination of discharge pipe 16 is about 0.75 in. Redirection means 30 similar to that shown in FIGS. 4, 5 and 6 is fitted around discharge pipe 16. Each of the moveable means 36 of redirection means 30 is about 6 inches by about 4 inches. Gaseous media source 18 is, for example, a cylinder containing air at 1000 psig. pressure. The gaseous media source includes a valving arrangement so that air can be supplied from gaseous media source 18 through gas header 21 and gas pipe 13 to conduit outlets 20a at predetermined constant flowrate, e.g., about 100 SCF/min. Alternately, e.g., using a distributor 10 without redirection means 30, the gaseous media source includes a valving arrangement as illustrated in FIG. 7 so that air can be supplied from gaseous media source 18 through gas pipe 13 to conduit outlets 20a at a predetermined variable flowrate, e.g., from about 25 SCF/min. to about 100 SCF/min. Such a particulate distributor can readily distribute over a zone with a radius in the order of about three to twelve feet a particulate material such as a macrosize catalyst having a diameter in the range of from about one sixty-fourth inch to about one-fourth inch and a length in the range of from about one thirty-second inch to about one-half inch. Thus, it is seen that the particulate distributor according to the present invention is capable of providing substantially uniform particulate distribution over a zone. The present apparatus can be easily adapted, e.g., by altering the position of the redirection means, and/or varying the flowrate of the gaseous media to provide substantially uniform particulate distribution over a zone or zones of essentially any configuration.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. Apparatus for distributing particulate material over a zone comprising:

a supply hopper, having inlet means and outlet means, for holding particulate material;

a deflection plate located adjacent to the end of said outlet means away from said supply hopper to deflect the direction of at least a portion of said particulate material flowing through said outlet means; and at least one rotatable conduit in fluid communication with at least one source of gaseous media, said conduit being situated such that at least a portion of said gaseous media from said conduit flows in the space between the end of said outlet means away from said supply hopper and said deflection plate to thereby cause at least a portion of said particulate material to be propelled in substantially the same direction as said flow.

2. The apparatus of claim 1 wherein said deflection plate is operably associated with said rotatable conduit so that said deflection plate rotates with said rotatable conduit.

3. The apparatus of claim 2 which comprises a plurality of said rotatable conduits.

4. The apparatus of claim 3 wherein said rotatable conduits extends from below said deflection plate and each of said conduits has an outlet positioned above said deflection plate and the flow of gaseous media from said outlets of said rotatable conduits acts as a propelling force to rotate said conduits.

5. The apparatus of claim 4 which further comprises redirection means located in the path through which at least a portion of said particulate material is propelled to redirect such particulate material so that the particulate material is substantially uniformly distributed over the zone.

6. The apparatus of claim 5 wherein the cross-sectional area of said deflection plate is larger than the cross-sectional area of the end of said outlet means away from said supply hopper.

7. The apparatus of claim 4 which further comprises means in fluid communication with said conduits to cause gaseous media to be supplied to said conduits at a predetermined variable flowrate so that said particulate material is substantially uniformly distributed over said zone.

8. The apparatus of claim 7 wherein the cross-sectional area of said deflection plate is larger than the cross-sectional area of the end of said outlet means away from said supply hopper.

9. A method of distributing catalyst particles in a chemical reaction zone comprising:

1. causing catalyst particles to pass through a supply hopper positioned to supply catalyst particles to said reaction zone and having inlet means and outlet means, said catalyst particles exiting said supply hopper through said outlet means;
2. deflecting the direction of at least a portion of said solid particles flowing through said outlet means, said deflecting being accomplished by a deflection plate located adjacent to the end of said outlet means away from said supply hopper; and
3. causing gaseous media from at least one source of gaseous media to flow from at least one rotatable conduit in the space between the end of said outlet means away from said supply hopper and said deflection plate so that at least a portion of said catalyst particles from said outlet means are propelled in substantially the same direction as said flow, thereby distributing catalyst particles in said chemical reaction zone.

10. The method of claim 9 wherein said catalyst particles are hydrocarbon conversion catalyst particles and said chemical reaction zone is a hydrocarbon conversion reaction zone.

11. The method of claim 10 wherein said gaseous media flows from a plurality of rotatable conduits each of which has an outlet positioned above said deflection plate and said flow of gaseous media from said outlets acts to rotate said conduits and said deflection plate.

12. The method of claim 10 wherein said gaseous media from said source is supplied to said conduits at a predetermined variable flowrate, thereby substantially uniformly distributing said hydrocarbon conversion catalyst particles in said hydrocarbon conversion reaction zone.

13. A method of hydrocarbon conversion comprising:

1. causing hydrocarbon conversion catalyst particles to pass through a supply hopper positioned to supply catalyst particles to a reactionzone and having inlet means and outlet means, said catalyst particles exiting said supply hopper through said outlet means;
2. deflecting the direction of at least a portion of said solid particles flowing through said outlet means, said deflecting being accomplished by a deflection plate located adjacent to the end of said outlet means away from said supply hopper;
3. causing gaseous media from at least one source of gaseous media to flow from at least one rotatable conduit in the space between the end of said outlet means away from said supply hopper and said deflection plate so that at least a portion of said catalyst particles from said outlet means are propelled in substantially the same direction as said flow, thereby distributing catalyst particles in said chemical reaction zone; and
4. thereafter contacting hydrocarbon with said hydrocarbon conversion catalyst particles in said hydrocarbon conversion reaction zone to effect desired chemical reaction of said hydrocarbon.

14. The method of claim 13 wherein said gaseous media flows from a plurality of rotatable conduits each of which has an outlet positioned above said deflection plate and said flow of gaseous media from said outlets acts to rotate said conduits and said deflection plate.

15. The method of claim 13 wherein said gaseous media from said source is supplied to said conduit at a predetermined variable flowrate, thereby substantially uniformly distributing said hydrocarbon conversion catalyst particles in said hydrocarbon conversion reaction zone.

* * * * *